(12) United States Patent
Hashimoto et al.

(10) Patent No.: US 8,520,487 B2
(45) Date of Patent: Aug. 27, 2013

(54) OPTICAL ELEMENT RETAINING DEVICE, OPTICAL ELEMENT TRANSFER DEVICE AND OPTICAL PICKUP DEVICE

(75) Inventors: Mitsuhiro Hashimoto, Ota (JP); Koichi Matsuyama, Adachi-ku (JP)

(73) Assignees: SANYO Electric Co., Ltd., Moriguchi-shi (JP); SANYO Optec Design Co., Ltd., Gunma (JP)

( * ) Notice: Subject to any disclaimer, the term of this patent is extended or adjusted under 35 U.S.C. 154(b) by 0 days.

(21) Appl. No.: 13/570,984

(22) Filed: Aug. 9, 2012

(65) Prior Publication Data

US 2013/0039161 A1    Feb. 14, 2013

(30) Foreign Application Priority Data

Aug. 13, 2011  (JP) ................... 2011-177353
Sep. 30, 2011  (JP) ................... 2011-215924

(51) Int. Cl.
G11B 7/00    (2006.01)
(52) U.S. Cl.
USPC ............. 369/112.23; 369/112.01; 369/44.14; 369/44.15

(58) Field of Classification Search
None
See application file for complete search history.

(56) References Cited

U.S. PATENT DOCUMENTS 7,916,414 B2 *  3/2011  Nakamura et al. ............ 359/824
8,130,600 B2 *  3/2012  Nakata et al. .............. 369/30.03

FOREIGN PATENT DOCUMENTS

JP    2010-165445    7/2010

* cited by examiner

*Primary Examiner* — Muhammad N Edun
(74) *Attorney, Agent, or Firm* — Morrison & Foerster LLP

(57) ABSTRACT

An element holding device of the present invention includes: a guide portion engaging with a guide shaft; a lens fixing portion on which to fix a collimator lens; an arm portion; an insertion portion having a hole portion in which to insert a guide shaft; a wire fixing portion made by protruding a side surface of the insertion portion in a −Y direction; and a wire fixed on the wire fixing portion. A bent portion being a leading end portion of the wire is housed in a slit. Thereby, excess deformation of a contact portion is suppressed.

17 Claims, 10 Drawing Sheets

OPTICAL ELEMENT RETAINING DEVICE, OPTICAL ELEMENT TRANSFER DEVICE AND OPTICAL PICKUP DEVICE

This application claims priority from Japanese Patent Application Number JP 2011-215924 and JP 2011-177353, the content of which are incorporated herein by reference in its entirety.

BACKGROUND OF THE INVENTION

1. Field of the Invention

The present invention relates to an optical element holding device configured to hold an optical element such as a collimator lens, an optical element moving device, and an optical pickup apparatus.

2. Description of the Related Art

A common optical pickup apparatus reads/writes information from/to an optical disc by irradiating an information recording layer of the optical disc with a laser beam and receiving the laser beam reflected by the information recording layer, i.e., returning light.

A spherical aberration occurs according to the thickness of a cover layer covering an information recording layer, depending on the standard of an optical disc. Further, different spherical aberrations occur even in one optical disc of a certain standard if the disc has multiple information recording layers, because the position of an information recording layer relative to a cover layer varies depending on which information recording layer is subjected to read/write operations.

An objective lens for CD/DVD has a function of correcting spherical aberration by diffractive annular zones provided in a surface of the lens. However, since an optical disc of the BD standard, for example, employs an objective lens of high NA, it is difficult to correct spherical aberration caused by the objective lens.

To cope with this, such spherical aberration is corrected by moving a collimator lens placed in the midway of the optical path of a laser beam, by a predetermined amount. This feature will be described with reference to FIGS. 10A to 10C. FIGS. 10A and 10B each show a device while cutting away a portion of the device, in which the cut portion is hatched.

A conventional optical element moving device 100 will be described with reference to FIG. 10A, where X directions indicate directions parallel with a laser beam passing through a collimator lens, Y directions indicate directions orthogonal to the X directions on a plane where guide shafts 102 and 103 are placed, and Z directions indicate directions orthogonal to the X directions and the Y directions.

The optical element moving device 100 shown in FIG. 10A mainly includes: an element holding portion 101 configured to hold a collimator lens 104; the guide shaft 103 engaging with a +Y direction-side end portion of the element holding portion 101; the guide shaft 102 inserted in a hole portion located in a -Y direction-side end portion of the element holding portion 101; and a screw-shaped feed shaft 105 configured to move the element holding portion 101 by a predetermined amount.

The feed shaft 105 is a screw-shaped member having a thread groove in its periphery, and a nut 107 made of a resin material is screwed to the feed shaft 105. In addition, plate-shaped nut holding portions 108 and 109 are placed at the -Y direction-side end portion of the element holding portion 101. The nut holding portions 108 and 109 are configured to sandwich the nut 107 from both sides in the X directions with the feed shaft 105 inserted therein.

When the feed shaft 105 is rotated by a drive force of a stepping motor 106 with the above configuration, the nut 107 is moved in conjunction with the rotation. Then, the nut 107 presses any one of the nut holding portions 108 and 109 to move the element holding portion 101 in the X directions by a predetermined amount.

There is a slight play between the feed shaft 105 and the nut 107. In this state, the nut 107 is not fixed to the feed shaft 105 and thus backlash occurs therebetween. Due to this backlash, the position of the collimator lens 104 held by the element holding portion 101 might not be fixed. To solve this, a spring 110 configured to press the element holding portion 101 in the +X direction is inserted on the guide shaft 102 at a position on a -X side of the element holding portion 101. This allows the nut holding portion 108 to press the nut 107 in the +X direction, which removes the play between the feed shaft 105 and the nut 107, suppresses the above-described backlash, and thereby fixes the position of the collimator lens 104.

However, the optical element moving device 100 of the above configuration might cause a failure due to the employment of the nut 107. Specifically, when the nut 107 is made to strike against a -X direction-side or +X direction-side end portion to move the element holding portion 101 back to its initial position, the nut 107 sometimes bites the thread groove of the feed shaft 105 at the end portion and cannot escape therefrom. In addition, the feed shaft 105 is set slightly longer than the movable range of the element holding portion 101 to have enough length to get the element holding portion 101 back to its initial position. With this configuration, the stepping motor 106 keeps applying a driving force to the feed shaft 105 for a while even after the element holding portion 101 is moved to an origin detection position if the element holding portion 101 is placed near the initial position. In this case, the nut 107 keeps pressing the nut holding portions 108 and 109 while this drive force is applied, which makes the nut 107 bite the feed shaft 105.

Further, as shown in FIG. 10B, an upper portion of the nut 107 is covered with a nut holding portion 111. Hence, as shown in FIG. 10C, the nut 107 keeps hitting the nut holding portion 111 while the stepping motor 106 is in normal operation, which results in noise and vibration.

Furthermore, the employment of the nut 107 requires multiple parts such as the nut holding portions 108 and 109 and the spring 110, which complicates assembly work.

A structure using a spring instead of the above nut is disclosed in Japanese Patent Application Publication No. 2010-165445 (Patent Document 1). Referring to FIGS. 7 and 8 of Patent Document 1, the torsion coil spring 80 is attached to the lens holder 62, and a side surface of the torsion coil spring 80 at a position near its leading end portion engages with the groove of the feed screw 63. This configuration enables a mechanism of moving the collimator lens 61 without a nut, and thus avoids the problems caused by the nut.

However, with the invention described in Patent Document 1, the mounting of the torsion coil spring to the optical pickup apparatus is sometimes not easy. Specifically, referring to FIGS. 11A and 11B and their description of Patent Document 1, the torsion coil spring 80 has one end being in contact with the feed screw 63 and the other end fixed by a second press-fix portion 72. Hence, when attached to the optical pickup apparatus, the lens holder 62 needs to be incorporated in the housing of the optical pickup apparatus with such shape of the torsion coil spring 80 kept. This work is very complicated and might reduce work efficiency.

The present invention has been made in view of such circumstances. An objective of the present invention is to provide an optical element holding device in which a spring is in contact with a feed shaft with a simple configuration, an optical element moving device, and an optical pickup apparatus.

SUMMARY OF THE INVENTION

An optical element holding device of the present invention configured to hold a lens in such a way that the lens is movable along a guide shaft, comprises: an insertion portion having a hole portion in which to insert the guide shaft; an element fixing portion formed integrally with the insertion portion and on which to fix the lens; the lens placed in the element fixing portion; a fixing portion placed on a side different from a side where the element fixing portion is placed and protruding to the outside from the insertion portion; and a wire having a helically-wound wound portion fitted on the fixing portion and having a part placed outside a leading end of the fixing portion, wherein a part of the wire is housed in a housing area provided in a leading end portion of the fixing portion.

An optical element moving device of the present invention comprises: a feed shaft placed along an optical path of a laser beam, having a helical thread groove in a surface thereof, and configured to be rotated by a drive force of a motor; a guide shaft placed substantially parallel with the feed shaft; and the optical element holding device described above, wherein a side surface of the part of the wire, which protrudes outside the fixing portion of the optical element holding device, is in contact with the thread groove of the feed shaft.

An optical pickup apparatus of the present invention comprises: a light-emitting element configured to emit a laser beam; an objective lens configured to focus the laser beam on an information recording layer of an optical disc; a light-receiving element configured to receive returning light which is the laser beam reflected by the information recording layer; and the optical element moving device according to claim 6 configured to move a collimator lens being the lens along an optical path of the laser beam.

An optical element moving device of the present invention comprises: a feed shaft placed along an optical path of a laser beam, having a helical thread groove in a surface thereof, and configured to be rotated by a drive force of a motor; a guide shaft placed substantially parallel with the feed shaft; an optical element holding portion placed to be movable along the guide shaft while a lens is fixed thereon and the guide shaft is inserted therein or engages therewith; and a spring fixed on the optical element holding portion, formed by winding a wire around an axis directed toward the feed shaft, and having a side surface of the wire in contact with the thread groove of the feed shaft.

An optical pickup apparatus of the present invention comprises: a light-emitting element configured to emit a laser beam; an objective lens configured to focus the laser beam on an information recording layer of an optical disc; a light-receiving element configured to receive returning light which is the laser beam reflected by the information recording layer; and the optical element moving device described above configured to move a collimator lens being the lens along an optical path of the laser beam.

An optical element moving device of the present invention configured to hold a lens configured to move along a laser beam, comprises: an element fixing portion on which to fix the lens; an insertion portion formed integrally with the fixing portion and in which to insert a guide shaft; a fixing portion protruding from a side surface of the insertion portion to the outside; and a spring inserted on the fixing portion, formed by winding a wire around an axis directed perpendicular to the side surface of the insertion portion, and placed in such a way that at least a part of the spring protrudes outside an end portion of the fixing portion.

BRIEF DESCRIPTION OF THE DRAWINGS

FIGS. 7A and 7B are perspective views each showing a case where no bent portion is provided, and FIG. 7C is a perspective view showing a case where a bent portion is provided.

FIGS. 10A and 10B are perspective views and FIG. 10C is a cross-sectional view.

DESCRIPTION OF THE INVENTIONS

An element holding device 50, an optical element moving device 11, and an optical pickup apparatus 10 according to an embodiment of the present invention will be described with reference to FIGS. 1 to 7.

Figure 1:
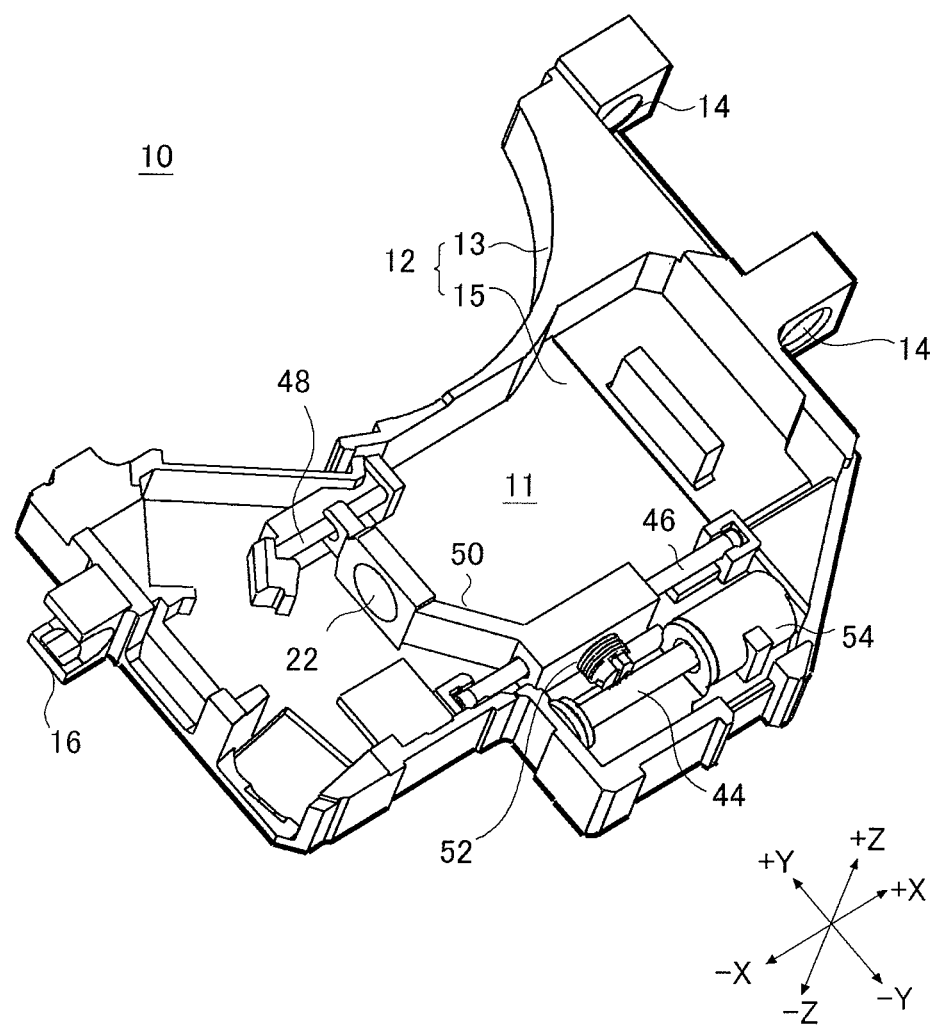
FIG. 1 is a perspective view showing a common optical pickup apparatus in which an optical element moving device of the present invention is incorporated.
Figure 3A:
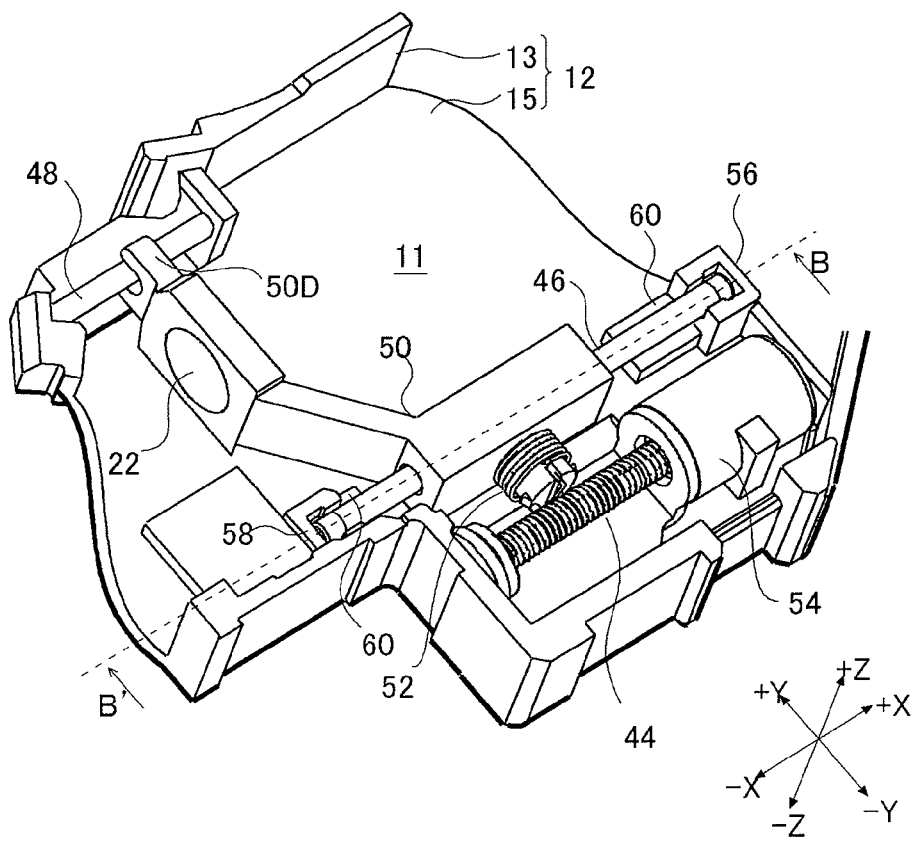
FIG. 3A is a perspective view showing the optical element moving device of the present invention.
Figure 3B:
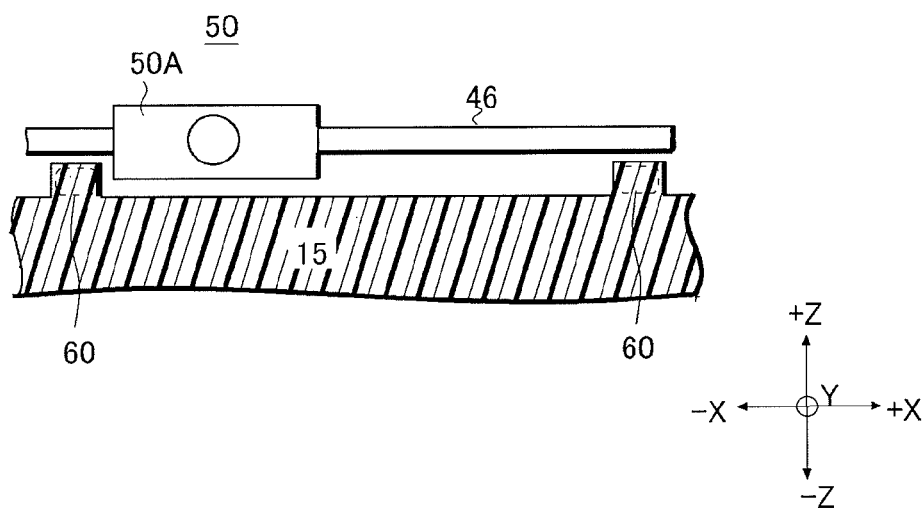
FIG. 3B is across-sectional view showing a part of a guide shaft.
Figure 4A:
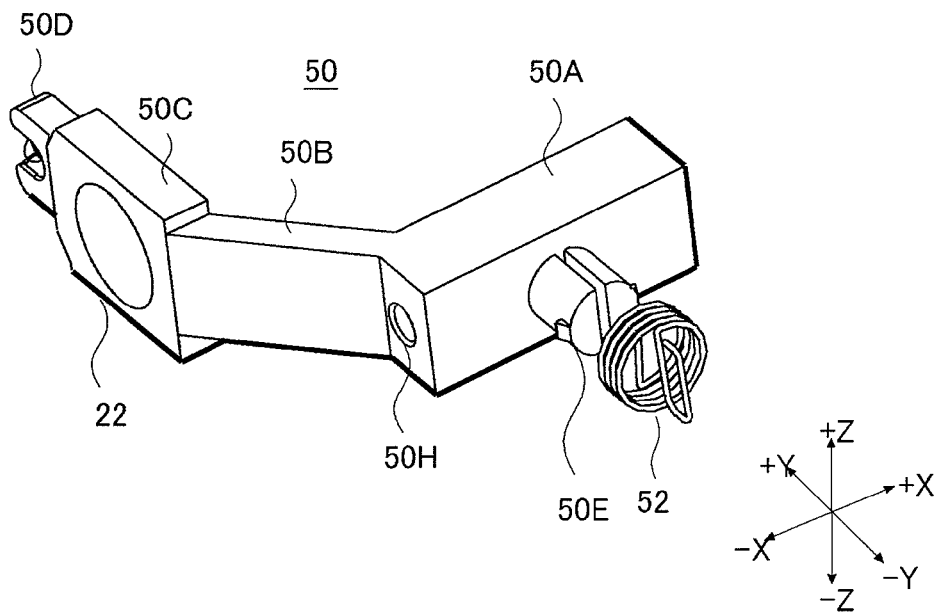
FIG. 4A is a view showing an element holding device of the present invention.
Figure 4B:
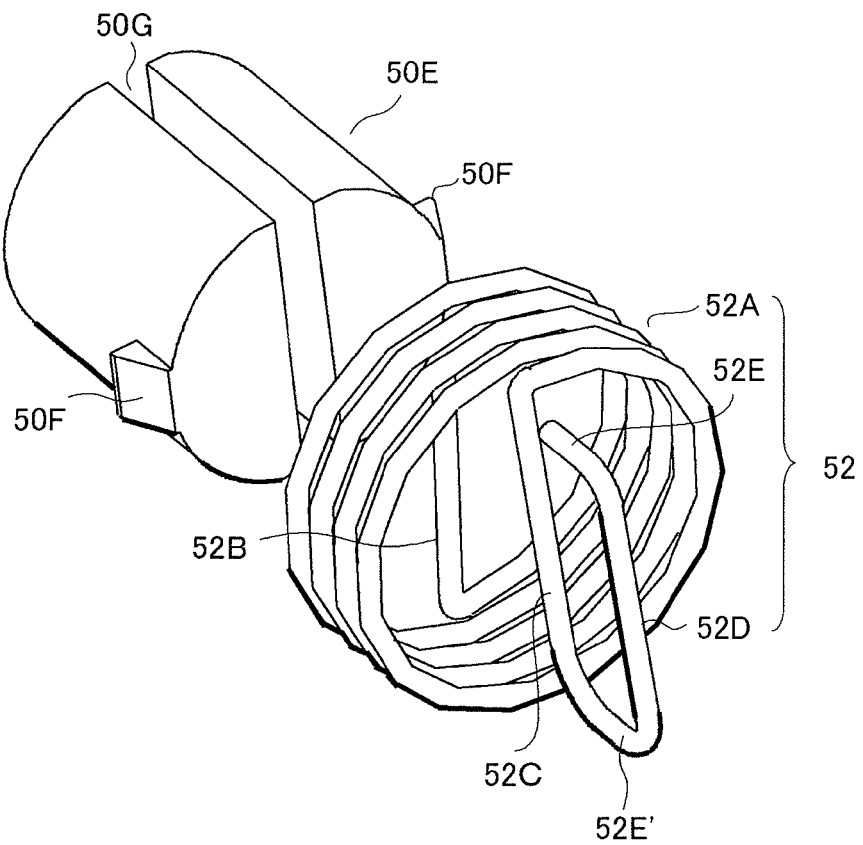
FIG. 4B is a view showing a configuration where a wire is incorporated in a fixing portion.

In this embodiment, the optical pickup apparatus 10 is configured to read/write information. FIG. 1 shows the configuration of the optical pickup apparatus 10. The optical element moving device 11 is incorporated in the optical pickup apparatus 10 and configured to move an optical element such as a collimator lens. FIGS. 3A and 3B show the configuration of the optical element moving device 11. The element holding device 50 is incorporated in the optical element moving device 11 and configured to hold the optical element such as a collimator lens in such a way that the element is movable. FIGS. 4A and 4B show the configuration of the element holding device 50.

Referring to FIG. 1, the optical pickup apparatus 10 has a configuration compatible with optical discs of the CD (Compact Disc) standard, the DVD (Digital Versatile Disc) standard, and the BD (Blu-ray Disc) standard, for example.

The general function of the optical pickup apparatus 10 is to read/write information from/to an optical disc by irradiating an information recording layer of the optical disc with a laser beam and receiving the laser beam having been reflected by the information recording layer. In this respect, the optical disc from/to which information is read/written may have a single information recording layer or, alternatively, have multiple (two or more) information recording layers.

Meanwhile, a blue-violet (blue) laser beam with a wavelength range of 395 nm to 420 nm (with a wavelength of 405 nm, for example) is used in the BD standard, a red laser beam with a wavelength range of 645 nm to 675 nm (with a wavelength of 650 nm, for example) is used in the DVD standard, and an infrared laser beam with a wavelength range of 765 nm to 805 nm (with a wavelength of 780 nm, for example) is used in the CD standard.

In the following description, X directions indicate directions parallel with the optical path of a laser beam passing through a collimator lens 22, Y directions indicate directions orthogonal to the X directions on a plane where guide shafts 46 and 48 are placed, and Z directions indicate directions orthogonal to the X directions and the Y directions. In addition, a principal surface of a housing 12, where a concave portion in which elements constituting the optical pickup apparatus are incorporated can be observed, is referred to as a back surface, and a surface opposed to the back surface is referred to as a front surface.

The optical pickup apparatus 10 of this embodiment is formed by placing various elements at their predetermined positions of the housing 12 made by integral resin molding. In this respect, the elements to be housed in the optical pickup apparatus include electronic components and optical elements through which a laser beam passes or on which a laser beam is reflected. For example, in FIG. 2, examples of the electronic components include laser devices 38 and 39 and PDICs 36 and 37, and examples of the optical elements include semitransparent mirrors 30 and 32, AS plates 34 and 35, and the collimator lens 22.

The housing 12 is made by injection molding of a resin material, such as PPS (Poly Phenylene Sulfide Resin), or the like. The housing 12 includes a substantially plate-shaped bottom surface portion 15 and a sidewall portion 13 made by protruding an edge portion of the bottom surface portion 15 in a thickness direction of the housing 12. Moreover, guide holes 14 in which to insert a guide shaft are provided at a +X direction-side edge portion of the housing 12, whereas a guide groove 16 with which a guide shaft engages is provided at a −X direction-side edge portion of the housing 12. As a material of the housing 12, die-casting alloy made mainly of aluminum (Al), magnesium (Mg), or zinc (Zn) may be used instead.

Although not illustrated, an inner sidewall portion is also provided inside the optical pickup apparatus 10 to protrude in the Z directions from the bottom surface portion 15. Components constituting the optical pickup apparatus 10 are fixedly attached to the sidewall portion 13 or the inner sidewall portion.

Figure 2:
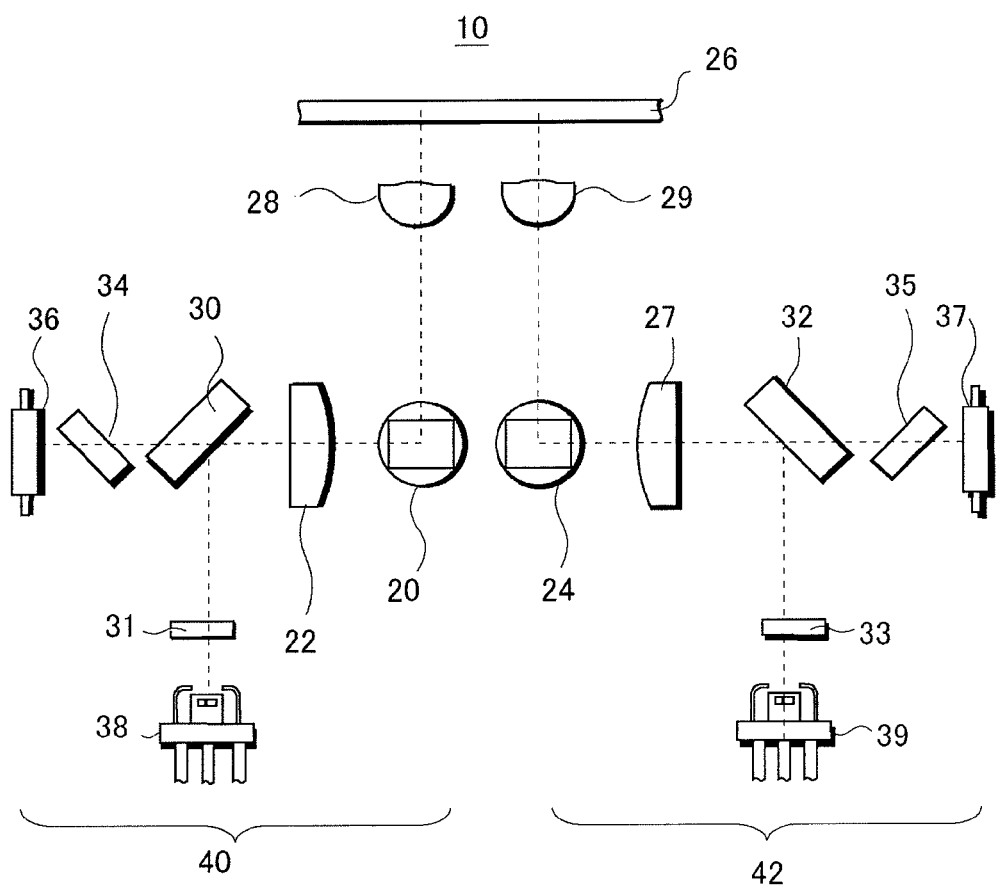
FIG. 2 is a view showing a common optical system incorporated in the optical pickup apparatus of the present invention.

Shown in the drawings are only components constituting the element holding device 50 and the optical element moving device 11 which are the gist of this embodiment. Specifically, the guide shafts 46 and 48, the collimator lens 22, the element holding device 50, a wire 52, a feed shaft 44, and a stepping motor 54 are housed in the housing 12. Further, various elements to be described later with reference to FIG. 2 are also housed in an area surrounded by the sidewall portion 13. Although not illustrated, a holder configured to hold an objective lens is placed on a surface opposed to the bottom surface portion 15 in such a way as to be movable by an actuator.

The optical elements included in the optical pickup apparatus 10 will be described with reference to FIG. 2. The optical pickup apparatus 10 includes a first optical system 40 for forming an optical path of a laser beam of the BD standard and a second optical system 42 for forming an optical path of laser beams of the DVD standard and the CD standard. Note that the optical pickup apparatus 10 does not necessarily have to have the two optical systems, but may have one optical system shared by these three standards. When the one optical system is shared by these three standards, the collimator lens 22 is adjusted to an optimal position according to these standards.

The first optical system 40 of the BD standard includes the laser device 38, a diffraction grating 31, the semitransparent mirror 30, the collimator lens 22, a reflecting mirror 20, an objective lens 28, the AS plate 34, and the PDIC 36.

The laser device 38 is made by packaging light-emitting elements configured to emit a laser beam with which to irradiate a disc 26 of the BD standard. In this respect, the laser device 38 may be made as a so-called CAN-type package or, alternatively, made as a lead frame-type package.

The diffraction grating 31 is configured to split a laser beam having been emitted by the laser device 38 into a zero-order diffracted light beam, a positive first-order diffracted light beam, and a negative first-order diffracted light beam.

The semitransparent mirror 30 is configured to reflect a laser beam having been emitted by the laser device 38 and passed through the diffraction grating 31 as well as to transmit a laser beam having been reflected by the disc 26 (returning light).

The collimator lens 22 is configured to convert a laser beam having been reflected by the semitransparent mirror 30 into a parallel light beam. In addition, the collimator lens 22 can be displaced along an optical axis, and is configured to correct spherical aberration caused by a cover layer covering an information recording layer of the disc 26. The collimator lens 22 is moved while being incorporated in the optical element moving device 11 to be described later with reference to FIGS. 3A and 3B.

The reflecting mirror 20 is configured to receive a laser beam having been transmitted through the collimator lens 22, and to reflect the received laser beam so that the laser beam can proceed at right angle to the information recording layer of the disc 26.

The objective lens 28 is placed right above the reflecting mirror 20, and is configured to focus a laser beam having been reflected by the reflecting mirror 20 on a signal recording layer of the disc 26.

The AS plate 34 is configured to give aberration for servo-mechanism to a laser beam having been reflected by the disc 26 and passed through the optical elements. As will be described later, the AS plate 34 is not an essential component, but there is also a model without the AS plate 34.

The PDIC 36 is a photodiode integrated circuit element for signal detection and functions as a photodetector. The PDIC 36 is configured to generate a light-reception output containing an information signal component as well as a servo signal component used for focus servo and tracking servo, upon reception of a laser beam for BD.

The read/write operations of the first optical system 40 are performed as follows.

First, a laser beam having been emitted by the laser device 38 passes through the diffraction grating 31 to be split into a zero-order diffracted light beam, a positive first-order diffracted light beam, and a negative first-order diffracted light beam. Such split is carried out to allow the PDIC 36 to obtain a servo signal used for focus servo and tracking servo. Then, the laser beam having been thus split is reflected by the semitransparent mirror 30, is then converted into a parallel light beam by the collimator lens 22, and is then reflected by the reflecting mirror 20 to proceed toward the disc 26 in a direction perpendicular thereto. Thereafter, the laser beam is focused on the signal recording layer of the disc 26 by refraction and diffraction caused by the objective lens 28.

The laser beam reflected by the signal recording layer of the disc 26 (returning light) passes through the objective lens 28, the reflecting mirror 20, and the collimator lens 22 and then reaches the semitransparent mirror 30. The laser beam having been transmitted through the semitransparent mirror 30 is given aberration by the AS plate 34 and then reaches the PDIC 36. Thereafter, in the PDIC 36, information is read, and focus servo and tracking servo are carried out based on the read information.

Next, description will be given of the second optical system 42 applied to discs of the DVD standard and the CD standard. Components of the second optical system 42 which are the same as those of the first optical system 40 will not be described.

The second optical system 42 includes the laser device 39, diffraction grating 33, the semitransparent mirror 32, collimator lens 27, reflecting mirror 24, objective lens 29, and the PDIC 37.

The read/write operations of the disc 26 in the second optical system 42 are performed as follows. First, a laser beam of the CD standard or the DVD standard is emitted by the laser device 39. The laser beam having been emitted by the laser device 39 passes through the diffraction grating 33 and is then reflected by the semitransparent mirror 32. The laser beam is then transmitted through the collimator lens 27, is then reflected by the reflecting mirror 24 so that the laser beam can proceed in a direction perpendicular to the information recording layer of the disc 26, and is then focused on the information recording layer of the disc 26 by the objective lens 29.

The laser beam having been reflected by the information recording layer of the disc 26, i.e., returning light, passes through the objective lens 29, is then reflected by the reflecting mirror 24, is then transmitted through the collimator lens 27 and the semitransparent mirror 32, and is then incident on a light-receiving surface of the PDIC 37. Thereafter, in the PDIC 37, information is read, and focus servo and tracking servo are carried out based on the read information.

Note that, not all the optical elements described above are essential. For example, the first optical system 40 may be formed only of the laser device 38, the semitransparent mirror 30, the collimator lens 22, the objective lens 28, and the PDIC 36. Further, the PDIC 36 may be built in the laser device 38. The same applies to the second optical system 42. The second optical system 42 may be formed of the laser device 39, the semitransparent mirror 32, the PDIC 37, the collimator lens 27, the reflecting mirror 24, and the objective lens 29.

The configuration of the optical element moving device 11 will be described with reference to FIGS. 3A and 3B. FIG. 3A is a perspective view showing a magnified portion of the optical element moving device 11, and FIG. 3B is a cross-sectional view taken along the line B-B' of FIG. 3A.

The optical element moving device 11 includes: the screw-shaped feed shaft 44 placed parallel with the optical path of a laser beam; the guide shafts 46 and 48 placed parallel with the feed shaft 44; the element holding device 50 moving along the guide shafts 46 and 48 while holding the collimator lens 22; and the wire 52 fixed on the element holding device 50 and wound toward the feed shaft 44.

The feed shaft 44 is made by forming a helical thread groove at a predetermined pitch in an outer peripheral surface of a rod-shaped member made of metal such as stainless steel, brass, or free-cutting steel. The feed shaft 44 is placed in such a manner that its axis is directed parallel with a laser beam passing through the collimator lens 22. The feed shaft 44 has a +X direction-side end connected to the stepping motor 54 and a −X direction-side end held rotatably. The stepping motor 54 is driven with a drive signal sent from the outside, and the feed shaft 44 is rotated by a predetermined amount by a drive force of the stepping motor 54.

The guide shaft 46 is a rod-shaped member made of metal such as stainless steel. The guide shaft 46 has an intermediate portion inserted in a hole portion of the element holding device 50, a +X direction-side end housed in a housing portion 56 constituting a portion of the housing 12, and a −X direction-side end housed in a housing portion 58. The two ends of the guide shaft 46 are fixedly attached to the respective housing portions 56 and 58 with an adhesive.

Convex portions 60 are each made by protruding the bottom surface portion 15 of the housing 12 in the +Z direction. The convex portions 60 are placed below the guide shaft 46 at positions on the +X side and −X side respectively of the element holding device 50. Referring to FIG. 3B, even when a +X-side end of an insertion portion 50A of the element holding device 50 is moved in the +X direction to bump into the corresponding convex portion 60 and stop, an extra-pulse is applied to the feed shaft 44 and thereby origin detection being a reference for determining the amount of movement of the element holding device 50 (the collimator lens 22) is performed. Similarly, even when a −X-side end of the insertion portion 50A of the element holding device 50 is moved in the −X direction to bump into the corresponding convex portion 60 and stop, an extra-pulse is applied to the feed shaft 44 and thereby origin detection being a reference for determining the amount of movement of the element holding device 50 (the collimator lens 22) is performed.

The guide shaft 48 is made by forming a portion of the housing 12 in the form of a shaft, and a guide portion 50D of the element holding device 50 engages with the guide shaft 48. To put it differently, the guide shaft 48 is made by allowing a portion of the sidewall portion 13 of the housing 12 to protrude in the −Y direction to extend continuously in the X directions. Note that, although the guide shaft 48 may be made separately from the housing 12 as in the case of the guide shaft 46, forming the portion of the housing 12 into the guide shaft 48 brings about an effect of reduction of components.

The feed shaft 44 and the guide shafts 46 and 48 are placed parallel with one another when viewed in the Z directions.

The element holding device 50 has the principal surface on/through which a laser beam is incident/transmitted and configured to hold the collimator lens 22 facing the X directions, a −Y direction-side edge portion in which to insert the guide shaft 46, and a +Y direction-side edge portion engaging with the guide shaft 48. With this configuration, the element holding device 50 is housed in the housing 12 to be movable in the X directions. The structure of the element holding device 50 will be described later with reference to FIGS. 4A and 4B.

The wire 52 is placed at a side surface of a −Y direction (a direction toward the feed shaft 44) side edge portion of the element holding device 50. A side surface of an end portion of the wire 52 is in contact with the thread groove of the feed shaft 44. This feature will be described later with reference to FIGS. 4 and 5.

Spherical aberration is corrected by moving the optical element moving device 11 of the above configuration in the X directions. As has been described above, spherical aberration caused by a cover layer of an optical disc is different according to the standard of the disc; further, spherical aberration caused in an optical disc of the BD standard having multiple information recording layers is different from one information recording layer to another. Even in these cases, it is possible to correct such spherical aberration and to focus a laser beam on the target information recording layer properly by allowing the optical element moving device 11 to move the collimator lens 22 to a predetermined position.

With reference to FIGS. 4 to 7, description will be given of the element holding device 50 incorporated in the optical pickup apparatus 10 and the optical element moving device 11.

The configuration of the element holding device 50 will be described with reference to FIGS. 4A and 4B. FIG. 4A is an overall perspective view of the element holding device 50, and FIG. 4B is a cutaway perspective view of a wire fixing portion 50E.

Referring to FIG. 4A, the element holding device 50 includes, in the following order starting from the +Y direction side: the guide portion 50D engaging with the guide shaft 48; a lens fixing portion 50C on which to fix the collimator lens 22; an arm portion 50B; the insertion portion 50A having a hole portion 50H in which to insert the guide shaft 46; and the wire fixing portion 50E made by protruding a side surface of the insertion portion 50A in the −Y direction. In this respect, the element holding device 50 is roughly in the faun of the alphabet "J" when viewed in the Z directions. The element holding device 50 is formed integrally by injection molding or casting of a resin material such as PPS or metal such as Al.

More specifically, the guide portion 50D is in the form of a groove (the letter "U") which is open in the +Y direction. The element holding device 50 is moved in the X directions by allowing this portion to engage with the guide shaft 48 shown in FIG. 3A.

The lens fixing portion 50C has an opening to which the collimator lens 22 having a lens surface in the X directions (an axis direction of the collimator lens) is fixedly attached.

The arm portion 50B has one end connected to the lens fixing portion 50C and the other end connected to the insertion portion 50A. Connecting the insertion portion 50A and the lens fixing portion 50C to each other through the arm portion 50B makes it possible to place the lens fixing portion 50C for fixing the collimator lens 22 at a predetermined position inside the optical pickup apparatus 10 regardless of space limitations.

The insertion portion 50A is in the form of a rectangular solid which is long in the X directions, and has a −X direction-side end portion (a side surface perpendicular to the optical axis direction and its vicinity) connected to the lens fixing portion 50C through the arm portion 50B. In addition, the insertion portion 50A has the hole portion 50H cylindrically penetrating the insertion portion 50A in the X directions. When in use, the guide shaft 46 shown in FIG. 3A is inserted in the hole portion 50H.

The wire fixing portion 50E is made by cylindrically protruding a portion near a central portion of a −Y direction-side side surface of the insertion portion 50A integrally in the −Y direction. In this respect, the −Y direction-side surface of the insertion portion 50A is parallel with the optical axis and located on a side opposed to a side where the collimator lens is placed. The wire fixing portion 50E is configured to fix the wire 52, which is wound in the form of a coil, on the element holding device 50 with the wire 52 inserted on the wire fixing portion 50E.

In this embodiment, the insertion portion 50A and the lens fixing portion 50C are connected to each other through the arm portion 50B. This configuration can make the insertion portion 50A and the lens fixing portion 50C farther from each other than a configuration where the lens fixing portion 50C is directly connected to the insertion portion 50A. In addition, the arm portion 50B has a lateral width smaller than those of the lens fixing portion 50C and the insertion portion 50A. With this configuration, even if vibration acts on the insertion portion 50A when the element holding device is in use, the vibration is reduced by the arm portion 50B and hence the reduced vibration acts on the lens fixing portion 50C. Incidentally, the element holding device 50 may have a shape other than the shape described above. Other shapes will be described concretely later with reference to FIGS. 8A and 8B.

Referring to FIG. 4B, the wire 52 includes, in the following order starting from the +Y direction side (insertion portion side): a linear portion 52B; a wound portion 52A; a linear portion 52C; a contact portion 52D; and a bent portion 52E. The wire 52 is formed by bending a wire. The wire 52 may be made of metal such as SUS or piano wire. The linear portion 52B is made by linearly forming a +Y direction-side end portion of the wire 52 in such a way that the end portion passes through the center of the wound portion 52A when the wire 52 is viewed in the Y directions. Similarly, the contact portion 52D and the linear portion 52C are each linearly formed to pass through the center of the wound portion 52A when the wire 52 is viewed in the Y directions. Accordingly, when the wire 52 is viewed in the Y directions, the contact potion 52D, the linear portion 52C, and the linear portion 52B substantially overlap one another. In addition, the linear portion 52C and the contact portion 52D are connected to each other through a portion which is bent in the form of the letter "U" at their lower ends. The wound portion 52A is made by helically winding the wire 52, and is formed to connect the lower end of the linear portion 52B and the upper end of the linear portion 52C to each other.

To put it differently, the wire 52 may be regarded as a spring. Specifically, the wound portion 52A of the wire 52 is a coil spring having an axis directed in the Y directions, and a portion of the wire 52 located on the −Y side of the wound portion 52A (i.e., the linear portion 52C, the contact portion 52D, and the bent portion 52E) is a torsion spring. Although the wire 52 is wound circularly in this embodiment, the wire 52 may be wound in the form of a polygon such as a triangle or a rectangle.

In this embodiment, the wire 52 has, at a position near its −Y-side (an end surface protruding from the insertion portion) end, the bent portion 52E made by bending an end portion of the contact portion 52D at right angle in the +Y direction. With this configuration, when the wire 52 is inserted onto the wire fixing portion 50E, the bent portion 52E of the wire 52 is housed in a slit 50G and thereby fixed therein. Thus, unwanted deformation of the contact portion 52D can be prevented and the degree of deformation can be optimized according to the diameter and type of the wire. This feature will be described later with reference to FIGS. 5 and 6.

The wire fixing portion 50E is substantially cylindrical, and has the slit 50G which divides the wire fixing portion 50E at its central portion. In addition, lock portions 50F are formed by protruding two −Y direction-side edges of an outer peripheral portion of the wire fixing portion 50E respectively in the +X and −X directions. In FIG. 4A, left and right semicircular portions made by division by the slit can be observed on a circular surface opposed to a surface where the wire fixing portion 50E and the insertion portion 50A are coupled to each other. The lock portions 50F are provided to these semicircular portions respectively. The diameter of the wire fixing portion 50E is set to be slightly smaller than the inner diameter of the wound portion 52A of the wire 52. Further, the −Y-side side surface of each lock portion 50F is a sloping surface where a −Y-side end is located inside the opposite end. In other words, the lock portion 50F is getting thicker from the −Y-side end toward the opposite end. This sloping surface allows the wire 52 to be easily fitted in the wire fixing portion 50E.

Figure 5:
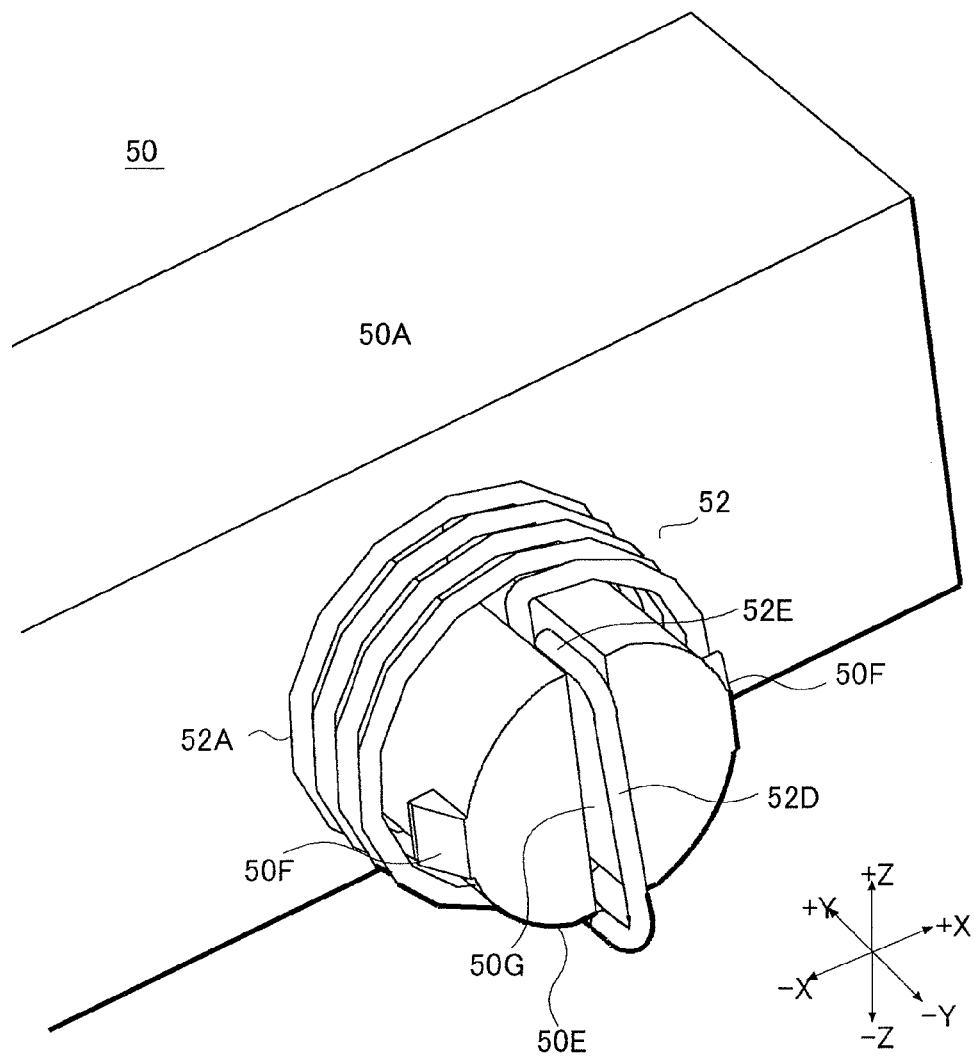
FIG. 5 is a perspective view showing the optical element holding device of the present invention in a state where the wire is incorporated in a wire fixing portion.

Referring to FIG. 5, once the wound portion 52A of the wire 52 is fitted in the wire fixing portion 50E of the above configuration, portions of the wire 52 located at −Y direction-side end portions of the wound portion 52A are locked by the two lock portions 50F, whereby the wire 52 can be prevented from coming off from the wire fixing portion 50E. In addition, the linear portions 52B and 52C and a portion at and near a leading end of the bent portion 52E of the wire 52 are housed in the slit 50G of the wire fixing portion 50E, whereby the wire 52 is fixed to be immovable in its rotation direction and thus the contact portion 52I is kept substantially parallel with the Z directions. In other words, excess deformation of the wire 52 at a lower end of the contact portion 52D can be suppressed (see FIG. 4B). Further, the contact portion 52D of the wire 52 is not housed in the slit 50G but placed to protrude in the −Y direction (toward the feed shaft 44 shown in FIG. 3A) more than a −Y-side end of the wire fixing portion 50E.

Figure 6A:
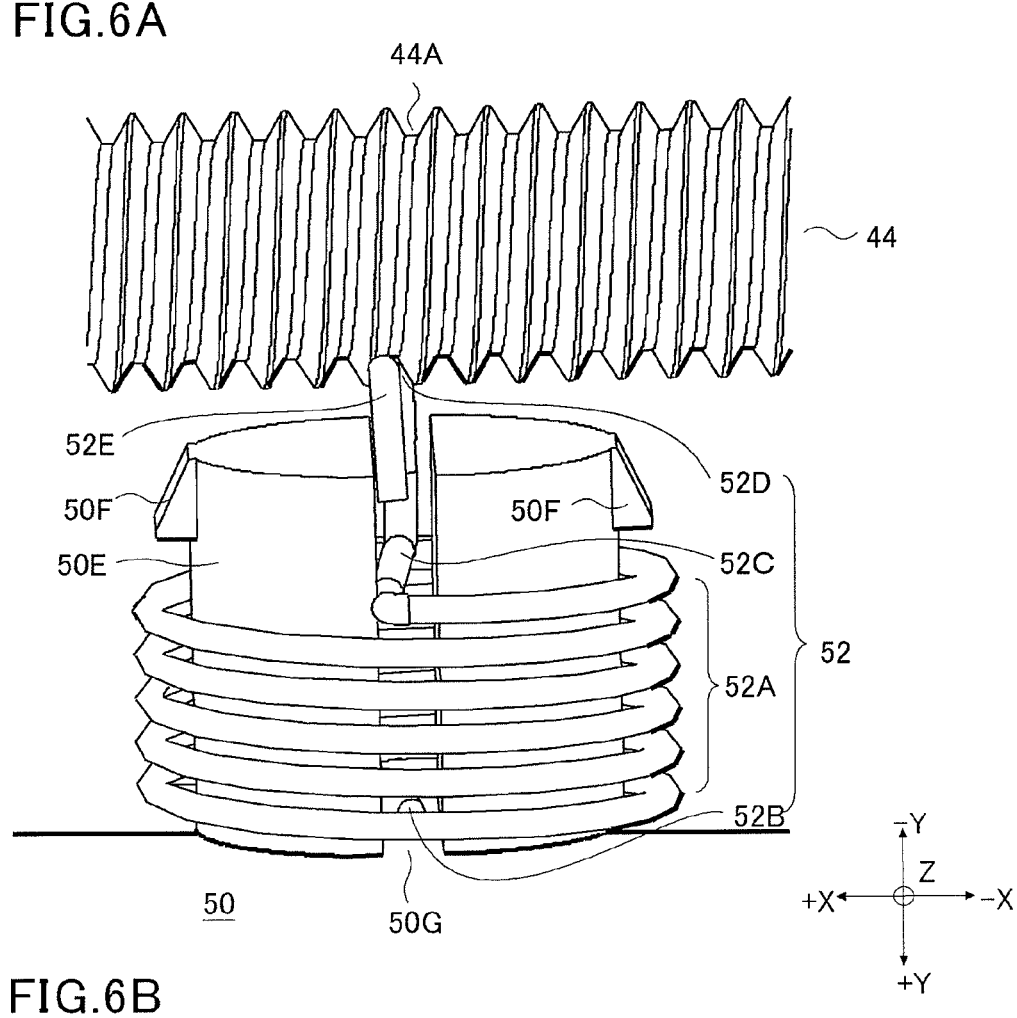
FIG. 6A is a view showing a structure where the wire is in contact with a feed shaft in the optical element holding device of the present invention.
Figure 6B:
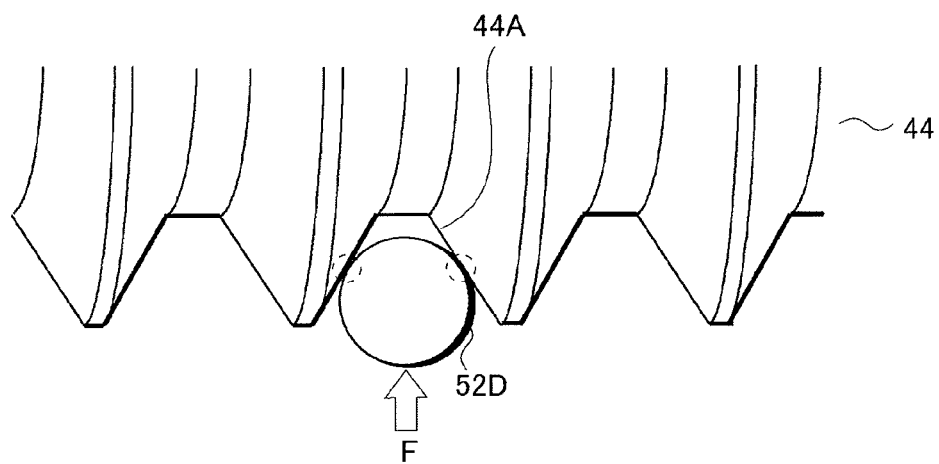
FIG. 6B is a view showing the structure in detail.

With reference to FIGS. 6A and 6B, description will be given of the configuration where the wire 52 is in contact with the feed shaft 44. FIG. 6A is a view showing a state where the wire 52 is biased toward the feed shaft 44, and FIG. 6B is a view showing the configuration where the contact portion 52D of the wire 52 is in contact with the feed shaft 44.

Referring to FIG. 6A, when the feed shaft 44 and the element holding device 50 are incorporated in the optical pickup apparatus 10, the wire 52 is interposed between the element holding device 50 and the feed shaft 44 while being slightly compressed in the Y direction (in the direction toward the feed shaft). Accordingly, the contact portion 52D is in contact with a thread groove 44A of the feed shaft 44 while being pressed thereagainst by a bias force generated by the compression of the wound portion 52A. The bias force is set within a range such that a rotation force of the feed shaft 44 can be transmitted to the element holding device 50 and that the contact portion 52D would not be plastic deformed (i.e., in a range below the elastic limit), e.g., approximately 3 gf or larger and 15 gf or smaller.

When the feed shaft 44 is rotated by a drive force of the stepping motor 54, a rotation force of the feed shaft 44 is transmitted to the element holding device 50 through the contact portion 52D of the wire 52, which slides on and in contact with the thread groove 44A. Thereby, the element holding device 50 is moved in the X directions by a predetermined amount.

In this embodiment, the bent portion 52E and bent portion 52E' being leading end portions of the wire 52 are housed in the slit 50G. With this configuration, when the feed shaft 44 is rotated and a force to move the wire 52 in the +X direction acts on the wire 52, the bent portion 52E is brought into contact with a +X-side sidewall of the slit 50G, whereby excess deformation of the contact portion 52D can be suppressed.

Referring to FIG. 6B, the side surface of the contact portion 52D of the wire 52 is in contact with two side surfaces of the thread groove 44A, which are included in one pitch, at two points. A bias force F to be applied on the thread groove 44A by the contact portion 52D through the two contact points is a substantial bias force to be applied on the feed shaft 44 by the contact portion 52D.

Figure 7A:
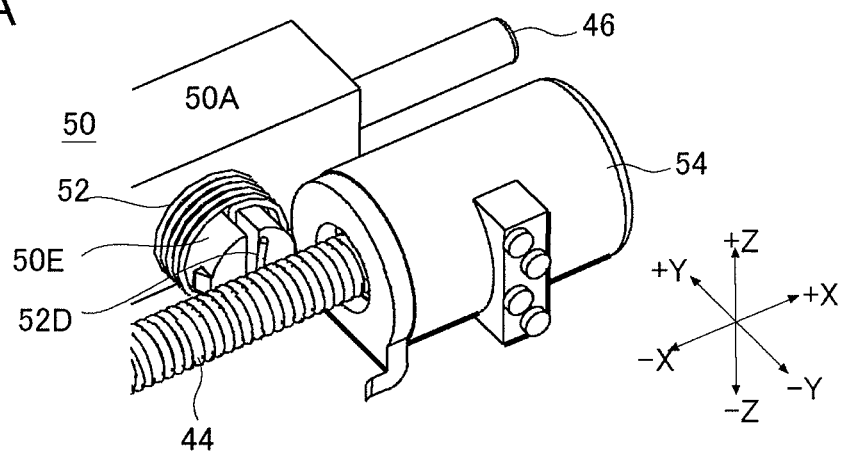
FIGS. 7A to 7C are views showing the optical element holding device of the present invention in detail.
Figure 7B:
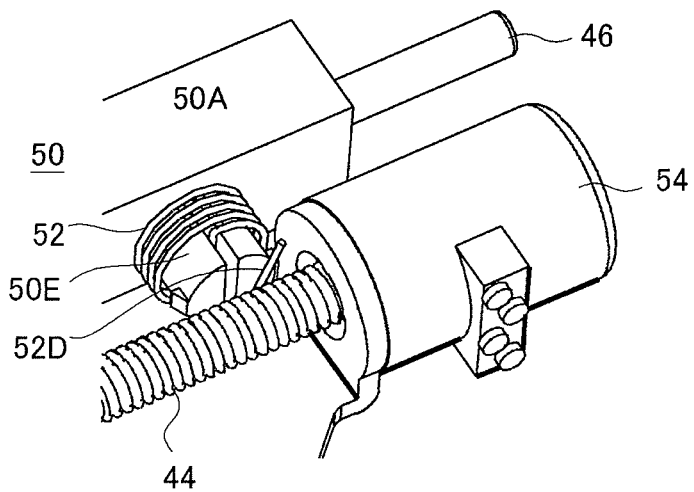
Figure 7C:
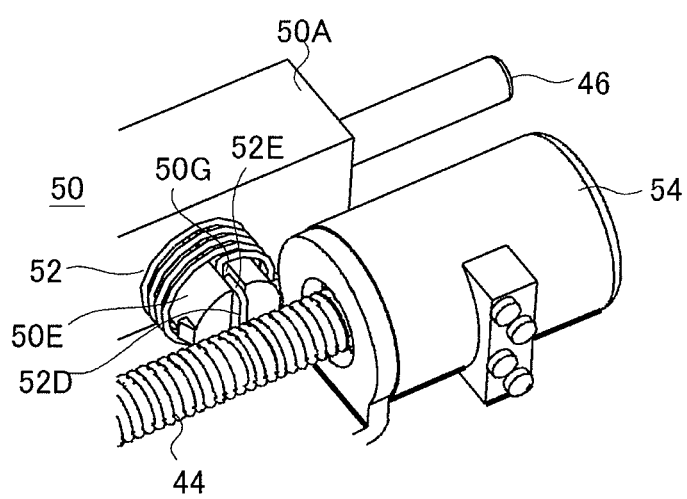

With reference to FIGS. 7A to 7C, description will be given of the contact portion 52D provided to the leading end of the wire 52. FIGS. 7A and 7B are perspective views each showing a case where no bent portion 52E is provided, and FIG. 7C is a perspective view showing this embodiment where the bent portion 52E is provided.

As has been described with reference to FIGS. 4 and 5, excess deformation of the wire 52 at the lower end of the contact portion 52D is prevented in this embodiment by placing the bent portion 52E being the leading end portion of the wire 52 in the slit 50G. This feature will be described below.

Referring to FIG. 7A, assuming that the bent portion 52E is not provided, the movement of an upper end portion of the contact portion 52D is not restricted. Even in this case, when the feed shaft 44 is rotated by the drive force of the stepping motor 54, the rotation force of the feed shaft 44 is transmitted to the insertion portion 50A through the wire 52 because the contact portion 52D is in contact with the thread groove 44A of the feed shaft 44, whereby the element holding device 50 is moved in the X directions.

However, if the contact portion 52D has the free end as described above, failure occurs in which the wire 52 is excessively deformed at a portion of the contact portion 52D as shown in FIG. 7B. More specifically, referring to FIG. 3B, if the stepping motor 54 keeps the feed shaft 44 rotated even after the rotation of the feed shaft 44 makes the element holding device 50 bump into one of the convex portions 60 for origin detection, the contact portion 52D is sometimes stressed and deformed as shown in FIG. 7B. The state where the contact portion 52D is stressed may adversely affect the following operation of the element holding device 50.

As a countermeasure against this, in this embodiment, the bent portion 52E is made by bending the upper end portion of the contact portion 52D in the +Y direction, and the bent portions 52E and 52E' thus made are housed in the slit 50G as shown in FIG. 7C.

Thereby, the contact portion 52D protrudes in the −Y direction more than the wire fixing portion 50E in order to contact the feed shaft 44, whereas the bent portions 52E and 52E' are inserted in the slit 50G. Thus, excess deformation of the contact portion 52D in the ±X directions is restricted by the slit 50G while the contact portion 52D can be deformed in the Y directions.

With the above configuration, excess deformation of the contact portion 52D is suppressed. Specifically, as shown in FIG. 3B, if the rotation force is kept applied on the wire 52 even after the rotation of the feed shaft 44 makes the element holding device 50 bump into one of the convex portions 60, a force to deform the contact portion 52D is applied on the wire 52. In this embodiment, since the bent portions 52E and 52E' are housed in the slit 50G, these portions function to suppress deformation of the contact portion 52D. Accordingly, excess deformation of the contact portion 52D is suppressed and no stress remains in the contact portion 52D. This makes smooth the subsequent operation of the element holding device 50.

Further, although the element holding device 50 shown in FIGS. 4A and 4B holds the collimator lens 22 according to the above description, the element holding device 50 may hold an optical element other than the collimator lens 22. For example, the element holding device 50 of this embodiment may hold a lens to be placed inside an optical camera having an autofocus function.

Figure 8A:
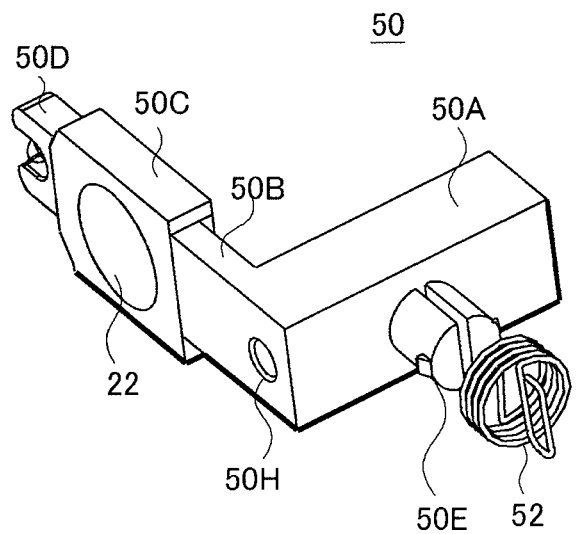
FIGS. 8A and 8B are perspective views each showing an element holding device of another embodiment of the present invention.
Figure 8B:
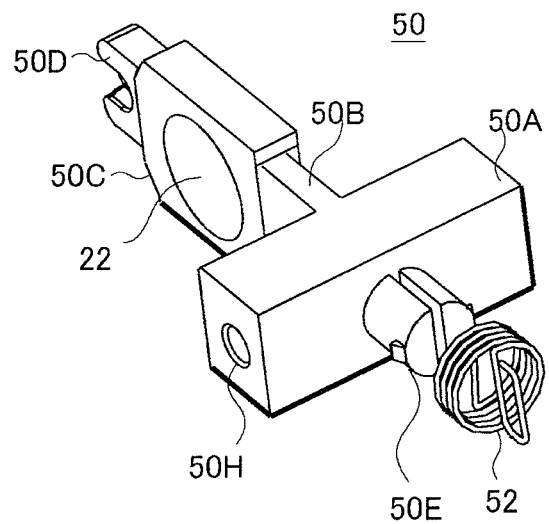

Furthermore, although the element holding device 50 shown in FIGS. 4A and 4B is in the form of the alphabet "J" in a plan view, the element holding device 50 may have another shape. Element holding device 50 of another embodiment will be described with reference to FIGS. 8A and 8B. FIGS. 8A and 8B are perspective views each showing the element holding device 50 of another embodiment.

Referring to FIG. 8A, an arm portion 50B is connected at right angle to one longitudinal end of an insertion portion 50A. The insertion portion 50A and a lens fixing portion 50C are connected to each other through the arm portion 50B. In this case, the element holding device 50 is in the form of the alphabet "L" in a plan view. In this respect, the lens fixing portion 50C may be connected directly to the insertion portion 50A without the arm portion 50B.

In the element holding device 50 shown in FIG. 8B, arm portion 50B is connected to an intermediate portion of a side surface of insertion portion 50A at right angle with respect to the longitudinal direction of the insertion portion 50A. In this case, the element holding device 50 is in the form of the alphabet "T."

It should be noted that the shapes of the element holding device 50 described above are merely an example, and the element holding device 50 may have another shape as long as the relative positional relationship between the lens fixing portion 50C and the insertion portion 50A is kept.

Figure 9:
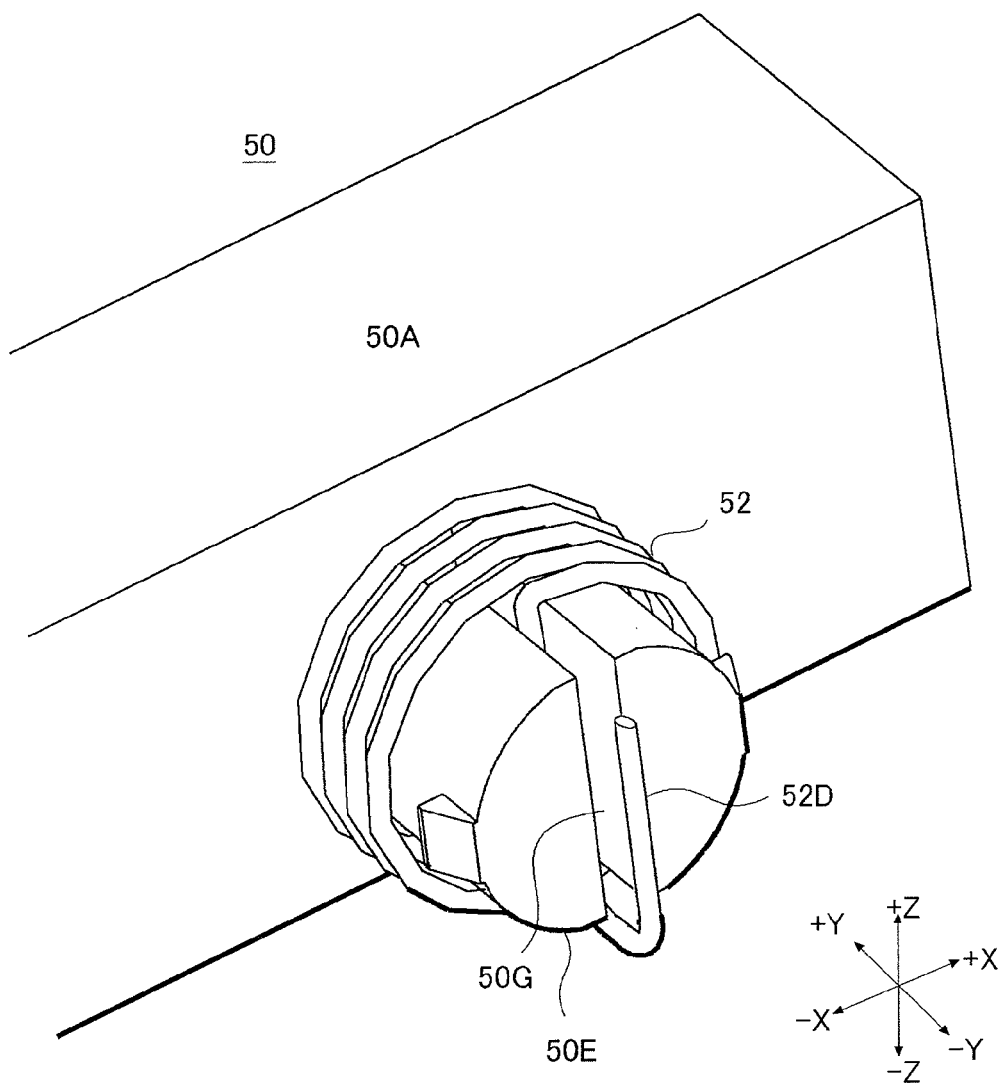
FIG. 9 is a perspective view showing an element holding device of another embodiment of the present invention.
Figure 10A:
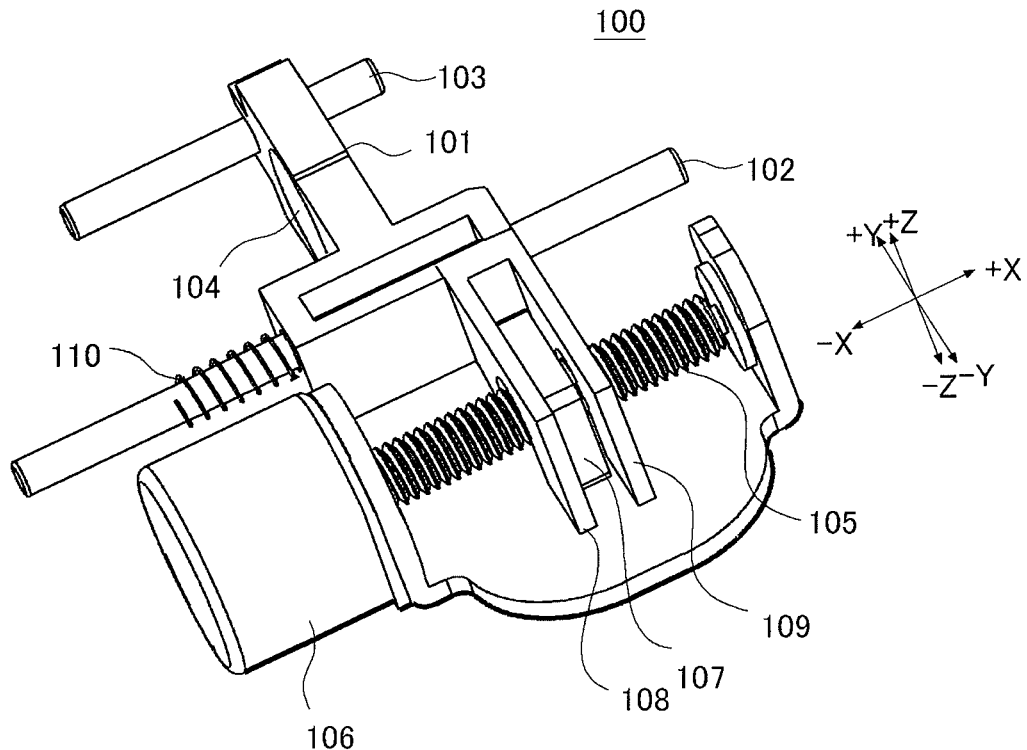
FIGS. 10A to 10C are views showing an optical element moving device of background art.
Figure 10B:
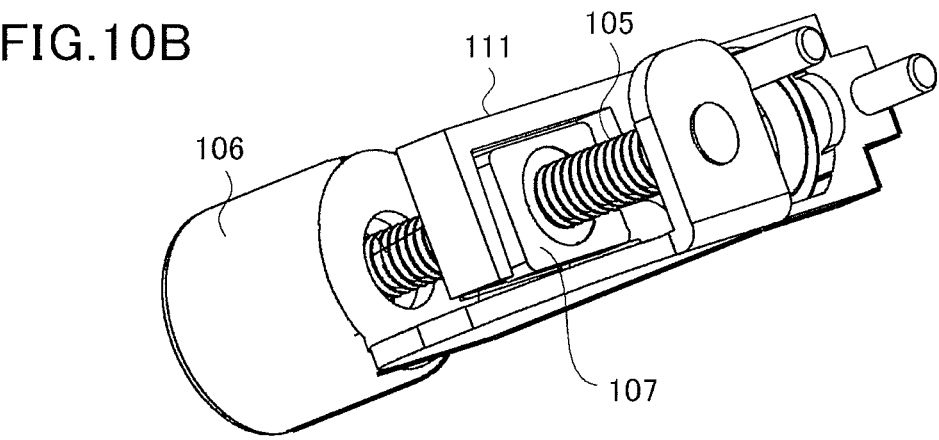
Figure 10C:
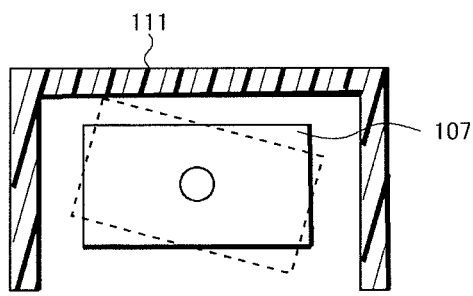

Another embodiment of the element holding device 50 will be described with reference to FIG. 9. In this embodiment, a contact portion 52D provided to a leading end portion of wire 52 is not housed in slit 50G but placed on a −Y side of an end of wire fixing portion 50E. The element holding device 50 of such a configuration can bring about a similar effect to those of the above holding devices 50.

According to the present invention, since the element holding portion configured to hold the optical element in such a way that the element is movable is in contact with the feed shaft through the wire. This achieves the configuration without the nut which has been described in the description of the related art, and suppresses noise and vibration which have been heretofore caused by the employment of the nut.

Further, as compared with the conventional apparatus using the nut, the present invention eliminates the need of components in contact with a nut, a spring to remove backlash, and the like. This reduces the number of components, and thus simplifies the structure and improves the reliability.

Furthermore, according to the present invention, a portion of the wire is housed in the housing area provided to the leading end portion of the fixing portion configured to fix the wire. This restricts the movement of the leading end portion of the wire, and thus suppresses unexpected deformation of the wire.

What is claimed is:

1. An optical element holding device configured to hold a lens in such a way that the lens is movable along a guide shaft, comprising:
   an insertion portion having a hole portion in which to insert the guide shaft;
   an element fixing portion formed integrally with the insertion portion;
   a lens placed in the element fixing portion;
   a fixing portion placed on a side different from a side where the element fixing portion is placed and protruding from the insertion portion; and
   a wire having a helically-wound wound portion fitted on the fixing portion and having a part extending beyond a leading end of the fixing portion,
   wherein the fixing portion has a slit, and
   a part of the wire is inserted in the slit of the fixing portion.

2. The optical element holding device according to claim 1, wherein the part of the wire is formed linearly at such a position as to protrude outside the leading end of the fixing portion.

3. The optical element holding device according to claim 1, wherein
   the fixing portion has a cylindrical shape, and
   the slit divides the fixing portion at or near a central portion of the fixing portion.

4. The optical element holding device according to claim 3, wherein the wire includes:
   a first linear portion having a linear shape and housed in the slit;
   a wound portion made by winding the wire;
   a second linear portion having a linear shape and housed in the slit;
   a contact portion protruding outside the fixing portion;
   a bent portion bent at and extending continuously from the contact portion and housed in the slit.

5. The optical element holding device according to claim 4, further comprising a lock portion made by protruding a part of a side surface of the element fixing portion to the outside, wherein
   the wound portion of the wire is inserted on the fixing portion at a part closer to the insertion portion than the lock portion.

6. An optical element moving device comprising:
   a feed shaft placed along an optical path of a laser beam, having a helical thread groove in a surface thereof, and configured to be rotated by a drive force of a motor;
   a guide shaft placed substantially parallel with the feed shaft; and
   the optical element holding device according to claim 1, wherein
   a side surface of the part of the wire, which protrudes outside the fixing portion of the optical element holding device, is in contact with the thread groove of the feed shaft.

7. An optical pickup apparatus comprising:
   a light-emitting element configured to emit a laser beam;
   an objective lens configured to focus the laser beam on an information recording layer of an optical disc;
   a light-receiving element configured to receive returning light which is the laser beam reflected by the information recording layer; and
   the optical element moving device according to claim 6 configured to move a collimator lens being the lens along an optical path of the laser beam.

8. An optical element moving device comprising:
   a feed shaft placed along an optical path of a laser beam, having a helical thread groove in a surface thereof, and configured to be rotated by a drive force of a motor;
   a guide shaft placed substantially parallel with the feed shaft;
   an optical element holding portion placed to be movable along the guide shaft while a lens is fixed thereon and the guide shaft is inserted therein or engages therewith; and
   a spring fixed on the optical element holding portion, formed by winding a wire around an axis directed toward the feed shaft, and having a part of the wire in contact with the thread groove of the feed shaft,
   wherein the axis of the spring is substantially perpendicular to the feed shaft.

9. The optical element moving device according to claim 8, wherein the side surface of the wire near a free end of the wire is in contact with the thread groove of the feed shaft.

10. The optical element moving device according to claim 8, wherein the optical element holding portion has a fixing portion provided on a lateral side of the optical element holding portion, the lateral side facing the feed shaft, the fixing portion protruding toward the feed shaft and inserted in the spring.

11. The optical element moving device according to claim 10, wherein
the fixing portion has a slit, and
a part of the spring is placed inside the slit.

12. The optical element moving device according to claim 11, wherein the part of the spring near two end portions of the spring is placed inside the slit.

13. The optical element moving device according to claim 11, wherein a part of a free end of the spring is placed inside the slit of the fixing portion.

14. The optical element moving device according to claim 10, wherein
a lock portion is provided by increasing a width of the fixing portion near a leading end portion of the fixing portion, and
the spring is inserted on the fixing portion at a part thereof closer to the guide shaft than the lock portion.

15. The optical element moving device according to claim 8, wherein the lens is a collimator lens.

16. An optical pickup apparatus comprising:
a light-emitting element configured to emit a laser beam;
an objective lens configured to focus the laser beam on an information recording layer of an optical disc;
a light-receiving element configured to receive returning light which is the laser beam reflected by the information recording layer; and
the optical element moving device according to claim 8 configured to move a collimator lens being the lens along an optical path of the laser beam.

17. An optical element moving device configured to hold a lens so as to move along a laser beam, comprising:
an element fixing portion on which to fix the lens;
an insertion portion formed integrally with the element fixing portion and in which to insert a guide shaft;
a fixing portion protruding from a side surface of the insertion portion; and
a spring inserted on the fixing portion, formed by winding a wire around an axis directed perpendicular to the side surface of the insertion portion, and placed in such a way that at least a part of the spring protrudes beyond an end portion of the fixing portion,
wherein the axis of the spring is substantially perpendicular to the guide shaft.

* * * * *